March 18, 1958 · H. A. OLK ET AL · 2,827,153
POWERED ROLL CONVEYORS
Filed April 7, 1954

INVENTORS:
HOWARD A. OLK
CARL G. VAN LOO
ROY J. VANDER VENNEN
BY
ATTORNEY

United States Patent Office 2,827,153
Patented Mar. 18, 1958

2,827,153

POWERED ROLL CONVEYORS

Howard A. Olk, Carl G. Van Loo, and Roy J. Vander Vennen, Grand Rapids, Mich., assignors to The Rapids-Standard Company, Inc., Grand Rapids, Mich., a corporation of Michigan Application April 7, 1954, Serial No. 421,588

7 Claims. (Cl. 198—127)

This invention relates to conveyors, and more particularly to a powered roll conveyor in which the carrier or driving rolls are powered by means of a belt frictionally contacting the lower surface of the driving or carrier rollers. More particularly, this invention is directed to the means for mounting the carrier rollers and to the means for mounting and adjusting the pressure rollers.

Although power driven, roller conveyors in which the rollers are driven by a moving belt on which the carrier rollers rest have been known and used for many years, such conveyors have not been entirely satisfactory. It is a well known practice to mount the ends of the shafts for the carrier rollers in upwardly opening slots in the frame. Such an arrangement provides an important safety factor because the rollers are free to rise from the belt and disengage the conveyor in the event any object is drawn between the rollers and the belt. This is particularly important in reducing injury to personnel. It is also recognized as a common expedient to provide belt supporting, pressure rollers which are vertically adjustable, either individually or in groups.

This invention provides a structure which is a substantial improvement over previously existing designs for this type of equipment which structure accomplishes all of the purposes of the prior designs while increasing both the strength and the operating efficiencies of the equipment.

Accordingly, it is a primary object of this invention to provide a belt driven, powered roller conveyor with improved characteristics of strength and safety. It is a further object of this invention to provide a conveyor of this type of substantially increased simplicity, both in its installation and in its adjustment.

This invention provides a means for seating and holding the carrier rollers which positively controls the lateral position of these rollers and increases the strength of the conveyor frame. This invention further provides a mounting arrangement for the pressure rollers assuring positive and precise control of the pressure exerted by these rollers against the belt. It also prevents possible misalignment of these rollers with relation to the frame. This latter eliminates the commonly experienced difficulty of improper belt tracking, characteristic of this type of conveyor especially in designs effecting group adjustment of the pressure rollers.

These and other objects and purposes of this invention will be recognized and understood by those acquainted with the design and construction of power conveying equipment upon reading the following specification and the accompanying drawings.

Figure 1:
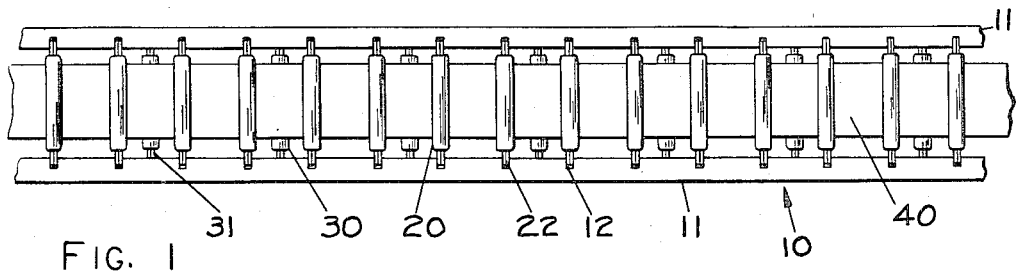
Fig. 1 is a fragmentary, plan view of a powered roll conveyor incorporating our invention.

In executing the objects and purposes of this invention we have provided a conveyor frame consisting of a pair of channels each having in its upper surface a plurality of equally spaced vertical slots for receiving and seating the ends of the axles of the carrier rollers. The strip of severed material created in the formation of the slots, instead of being removed from the frame, is pressed into a reverse shape to form a saddle supporting the carrier roller axles both vertically and laterally. The pressure rollers are mounted in groups by means of a secondary frame located exteriorly of the main frame with the shafts of the pressure rollers extending through close tolerance, slotted openings in the main frame. The secondary frame serves the dual purpose of supporting the pressure rollers and controlling their vertical position. The slots in the main frame serve the purpose of accurately positioning each end of the pressure rollers longitudinally of the conveyor. The driving belt operates between the pressure and carrier rollers.

Referring now specifically to the drawings, the numeral 10 refers to a conveyor having a pair of generally C-shaped channel sections forming the structural side rails 11 thereof. The side rails 11 are each equipped with a plurality of preferably equally spaced slots 12. The slots 12 extend down the vertical web 13 of the side rails 11 and partially across the top flange 14 thereof.

In the formation of the slots 12 the metal representing the area of the slot is not removed. It is merely severed from the frame 11 on each side and reformed into a reverse bend to form a hanger or saddle 15 the lower portion of which is horizontal and extends outwardly, beneath and parallel to the top flange 14 of the rail and the vertical portion of which is parallel to and spaced outwardly from the vertical web 13 of the rail 11. Thus, there is formed a slot 12 which, in effect, is a pocket open on top and on the face directed inwardly toward the center of the conveyor and on each of its sides. The bottom and outward end of the pocket are closed by the saddle 15. This design is readily adapted to fabrication by punching with the formation of the saddle being completed in one or at the most a few steps, all adapted to fully automatic execution.

The carrier rollers 20 are those mounted in the upper portion of the conveyor and provide the actual driving surface of the conveyor which contacts and carries the articles. The carrier rollers 20 may be of any suitable construction. Preferably, they are tubular with suitable, friction reducing bearings enclosed in each end. The inner race 21 of this bearing has a hexagonal, central opening for receipt of the hexagonal shaft 22.

The length of the shaft 22 is such that it extends through the slots 12 into the saddles 15 on both sides of the conveyor with the ends of the shaft either touching or almost touching the vertical portion of the saddle 15. This arrangement prevents lateral shifting of the carrier roller shaft 22. The cross sectional size of the shaft 22 is such that it will seat in the slot 12 with two of its flat surfaces held by the sides of the slot whereby the shaft cannot rotate. The fit should be as close as possible without binding the shaft or preventing its free, vertical movement within the slot. It is this freedom of vertical movement which provides the safety factor in the conveyor's operation.

While the conveyor is described as equipped with equally spaced carrier rollers 20, it will be recognized that this is merely a preferable construction. It is equally possible to construct a conveyor with a modification of this spacing arrangement within reasonable limits without departing from the principle of the invention either structurally or functionally.

Figures 3, 4:
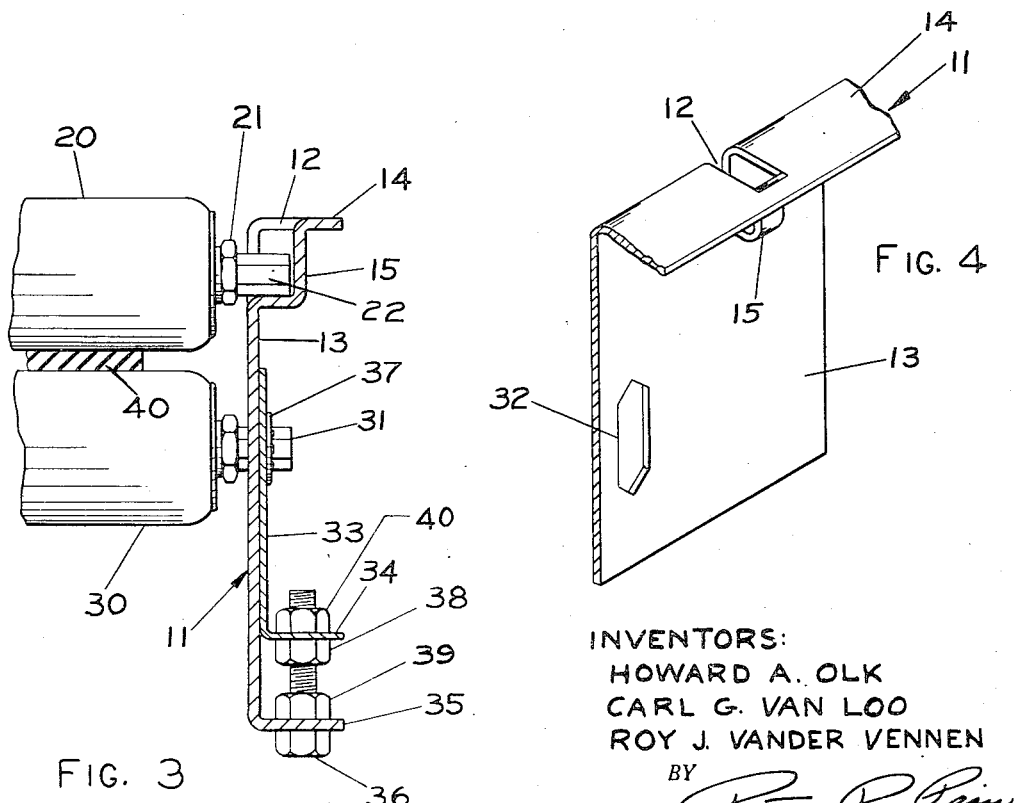
Fig. 3 is an enlarged, fragmentary, sectional, elevation view taken along the plane III—III of Fig. 2.
Fig. 4 is an enlarged, oblique, fragmentary view of one of the mounting slots for the carrier rollers.

The pressure rollers 30 are, like the carrier rollers 20, equally spaced but the spacing being preferably double that of the carrier rollers. Thus, there are two carrier rollers 20 between each of the pressure rollers 30. The pressure rollers 30 are identical in construction to the carrier rollers 20 and, like the carrier rollers 20, are mounted upon a hexagonal shaft 31 of approximately the same length. The channel sections forming the rails 11 are provided with vertical slots 32 in the web 13 (Fig. 4) to permit the ends of the shafts 31 to pass therethrough. The slots 32 are V-shaped at each end to match the hexagonal shape of the shafts 31. The width of the slots 32 is similar to the width of the slots 12, there being sufficient clearance to permit the shafts 31 to move freely in a vertical direction without binding yet holding the shafts against both rotation and movement longitudinally of the conveyor.

Figure 2:
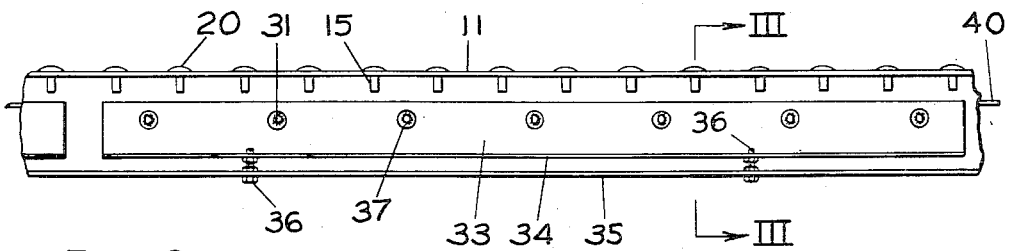
Fig. 2 is a fragmentary, side elevation view of the conveyor appearing in Fig. 1.

Seated against the exterior face of the vertical web 13 of each of the rails 11 is a long L-shaped plate. The height of the plate 33 is such that an appreciable space exists between the top end of the frame member and the bottom of the saddle 15 and between the bottom or horizontal leg 34 of the plate and the lower horizontal flange 35 of the rail 11. The plates 33 are each secured to their adjacent rails 11 by means of a pair of bolts 36 passing through the flange 35 and the leg 34. The bolts 36 are held against downward movement by a locking or jamming nut 39. The bolt is equipped with an adjustment nut 38 bearing against the bottom surface of the leg 34. By rotation of the adjustment nut 38, the vertical position of the plate 33 may be adjusted. After adjustment, the plate 33 is secured against possible upward movement by the locking nut 40. Two of the bolts 36 are provided for each of the plates 33 (Fig. 2).

Each plate 33 is provided with a plurality of hexagonal openings, each one designed to seat closely about one of the shafts 31. The shafts 31 are locked against lateral movement and the plates 33 held against disengagement from the rail 11 by self-locking washers 37. The plates 33 are of sufficient length to support a group of the pressure rollers 30. The number of rollers included in such a group may vary. In the preferred embodiment illustrated, it includes seven rollers.

The carrier rollers 20 and pressure rollers 30 are vertically separated by a belt 40. The belt 40 is driven by any suitable mechanism which includes a prime mover and normally a gear reducer. It may also include a reversing mechanism and an appropriate belt tensioning device. The manner in which the belt is driven is immaterial to the invention and is not illustrated. The belt 40 is preferably of a reinforced rubber construction but may be fabricated of any flexible material having the necessary tensile strength and a surface having a high coefficient of friction.

*Operation*

The vertical adjustment of the pressure rollers 30 determines the amount of contact between the belt and the carrier rollers since these rollers support the belt against the carrier rollers 20. For a normal operating length of conveyor the vertical adjustment of the pressure rollers 30 is such that the major weight of the carrier rollers 20 is carried by the saddle 15 with just sufficient contact between the belt and the carrier rollers 20 to effectively move the articles along the conveyor.

The normal light operating contact between the belt 40 and the pressure rollers 30 is such that almost all of the weight of the rollers is carried by the saddles 15. The weight of the moving articles is also carried by saddles. The saddles 15 prevent the rollers under the articles from pressing against the belt 40 with any appreciably increased pressure as a result of the passage of the articles over them.

Should the progress of the article be obstructed, the article will cease to move and the friction between the surface of the article and the carrier rollers 20 should be sufficient to hold the rollers stationary despite the movement of the belt. This is desirable to prevent damage to the bottom of the article when its movement is halted such as would result from a continuously turning roller. This condition is also desirable because the light contact between the carrier rollers and the belt incident to such an adjustment prevents the belt from being depressed into sags or loops between each of the pressure rollers 30. The elimination of this sagging or concaving of the belt between the pressure rollers greatly increases the life of the belt.

In the normal conveyor installation, various sections of the conveyor will require different degrees of engagement between the carrier rollers 20 and the belt 40. Thus, where it is expected that the articles may accumulate and their progress be temporarily halted by a pile up such as is characteristic of a storage portion of such a conveyor, the engagement between the carrier rollers 20 and the belt 40 should be the least possible to effectively move the articles when their movement is unobstructed. Where, however, the conveyor transverses a slight incline or where there is a sweep off, the degree of contact between the carrier rollers and the belt must be substantially greater. This is particularly true in the case of a sweep off where an arm or similar obstruction extends across the conveyor to engage the articles and sweep them onto another conveyor or to move them from another conveyor onto the roller conveyor. The turning of the article and the fact that normally only a small portion of the surface of the article is in contact with the rollers requires substantial engagement between the carrier rollers and the belt to insure continued movement of the articles. As articles are turned by a sweep off, their resistance increases, thus, more friction must be generated between the carrier rollers and the belt. In the case of an article which is only partially resting on the rollers, the weight of the article does not of itself provide sufficient friction between the carrier rollers and the belt to assure engagement. The additional pressure must be provided by the pressure rollers.

These various degrees of engagement between the carrier rollers and the belt are effected by adjusting the vertical position of the secondary frame 33. The frame may be slightly inclined longitudinally of the conveyor to provide minimum engagement at one end and maximum engagement at the other. Adjustment is easily effected since an entire group of rollers may be vertically positioned by means of only four bolts. In making the adjustment, the operator has to consider the vertical position only of the pressure rollers since their longitudinal position and thus alignment crosswise of the conveyor is automatically determined by the slots 32. This eliminates the problem of possible transverse misalignment of the pressure rollers 30 such as would cause the belt to track improperly and thus ride on one side or the other.

A roller conveyor constructed according to this invention in substance consists of a primary frame with the entire loads imposed upon the conveyor carried by the side rails 11. The pressure rollers 30 together with the plates 33 constitute a secondary frame assembly free from the primary frame to the extent it may be vertically adjusted with respect to the primary frame. The secondary frame assembly, however, is merely for adjustment purposes and serves neither as a means of carrying the loads imposed on the conveyor nor as a reinforcement for the primary frame. The slots 32 in the rail webs 13 serve as the alignment control means for the secondary frame assembly.

The use of the saddle 15 materially increases the strength and life of the conveyor. Since a major portion of the load on the carrier rollers 20 is normally absorbed by the contact between the ends of the shafts 22 and the frame 11, the use of the saddle providing a broad supporting surface for the shaft is a material, structural improvement. In conventional designs the entire weight of these rollers had to be supported on a surface no wider than the thickness of the rail itself. The use of the saddle 15 substantially reduces the tendency of the rail to wear at the bottom of the slots 12. Further, by forming the saddles 15 the top flange 14 of the rails 11 is positively supported as if by a plurality of brackets. This strengthens and stiffens the top flange 14.

By so mounting the carrier rollers 20 that they are held to the conveyor only by their weight and are free to move up out of the conveyor, an important safety factor is maintained. Should an operator accidentally get his hand or arm between the carrier rollers 20 and the belt, the accident will not result in crushing or injury to the operator because the rollers will automatically lift out of their slots long before sufficient clamping pressure will have occurred to do injury. At the same time, should some solid object such as a piece of wood or metal fall into this area, the rollers will be automatically ejected before injury occurs either to the rollers or to the belt.

It will be recognized that various modifications of this invention may be made, each without departing from the principles thereof. Each of these modifications is to be considered as included in the hereinafter appended claims unless these claims, by their language, expressly state otherwise.

We claim:

1. In a power operated conveyor having a pair of side rails, a belt between said rails, carrier rollers resting on said belt, pressure rollers beneath said belt and a shaft supporting each of said pressure rollers, the improvement therein comprising: a plurality of vertically elongated slots in each of said rails for receiving the ends of said shafts therethrough; a vertically adjustable plate seated against the outer face of each of said rails for supporting the pressure rollers in gang fashion; the ends of said shafts being fastened to said plates; vertically adjustable means fastened to said rails and to said plates for supporting said plates and gang adjusting the pressure rollers.

2. In a power operated conveyor having a pair of side rails, a belt between said rails, carrier rollers resting on said belt, pressure rollers beneath said belt and a shaft supporting each of said pressure rollers, the improvement therein comprising: a plurality of vertically elongated slots in each of said rails for receiving the ends of said shafts therethrough; a vertically adjustable plate seated against the outer face of each of said rails for supporting the pressure rollers in gang fashion; the ends of said shafts projecting through said plates and means fastening said shafts to said plates; vertically adjustable means fastened to said rails and to said plates for supporting said plates and gang adjusting the pressure rollers.

3. In a power operated conveyor having a pair of side rails, a belt between said rails, carrier rollers resting on said belt and pressure rollers beneath said belt, said pressure rollers being arranged in groups, a shaft supporting each of said pressure rollers, the improvement therein comprising: a plurality of vertically elongated slots in each of said rails for receiving the ends of said shafts therethrough; vertically adjustable plates seated against the outer face of each of said rails; said plates arranged in pairs, one on each side of said conveyor; each pair of said plates mounting one of said groups of pressure rollers for supporting the pressure rollers in gang fashion; the ends of said shafts projecting through said plates and means fastening said shafts to said plates; vertically adjustable means fastened to said rails and to each of said plates for supporting said plates and gang adjusting the pressure rollers.

4. In a power operated conveyor having a belt and a plurality of carrier rollers resting thereon, the combination comprising: a pair of rails forming a primary frame; a pair of plates forming a secondary frame, one of said plates slidably seated against each of said rails; a plurality of pressure rollers beneath said belt, and means on said pressure rollers for fixing said pressure rollers to each of the plates of said secondary frame; said rails each being vertically apertured for receiving said pressure roller fastening means therethrough to support the pressure rollers in gang fashion; vertically adjustable means for fastening each of said plates of said secondary frame to said rails for gang adjusting the pressure rollers.

5. In a power operated conveyor having a pair of side rails, each having a vertical web and horizontal flanges, a belt between said rails, carrier rollers resting on said belt, pressure rollers beneath said belt and a shaft supporting each of said pressure rollers, the improvement therein comprising: a plurality of vertically elongated slots in each of said rails for receiving the ends of said shafts therethrough; a vertically adjustable plate seated against the outer face of each of said rails for supporting the pressure rollers in gang fashion; the ends of said shafts being fastened to said plates; vertically adjustable means fastened to said rails and to said plates for supporting said plates for gang adjusting the pressure rollers; each of said side rails having a plurality of slots, said slots being aligned in pairs transversely of said conveyor; a part of each of said slots being in said vertical web and a part in said horizontal flange; a saddle aligned with each of said slots and depending beneath said horizontal flange; said saddle having a vertical portion and a horizontal portion; an axle for supporting each of said carrier rollers; the ends of said axles passing through said slots and seated in said saddles.

6. In a power operated conveyor having a pair of side rails, a belt between said rails, carrier rollers resting on said belt, pressure rollers beneath said belt, and a shaft supporting each of said pressure rollers, the improvement therein comprising: a plurality of vertically elongated slots in each of said rails for receiving the ends of said shafts therethrough; an outwardly extending flange projecting from the bottom of said rail; a vertically adjustable plate seated against the outer face of said rails; the ends of said shafts being fastened to said plates through said elongated slots; an outwardly projecting flange on the bottom of said plate; and adjustable means fastened to the flange of said rail and the flange of said plates for supporting and vertically adjusting said plates.

7. In a power operated conveyor having a pair of side rails, each having a vertical web and horizontal flanges, a belt between said rails, carrier rollers resting on said belt, pressure rollers beneath said belt, and a shaft supporting each of said pressure rollers, the improvement therein comprising: a plurality of vertically elongated slots in each of said rails for receiving the ends of said shafts therethrough; an outwardly extending flange projecting from the bottom of said rail; a vertically adjustable plate seated against the outer face of said rails; the ends of said shafts being fastened to said plates through said elongated slots; an outwardly projecting flange on the bottom of said plate; and adjustable means fastened to the flange of said rail and the flange of said plates for supporting and vertically adjusting said plates; each of said side rails having a plurality of slots, said slots being aligned in pairs transversely of said conveyor; a part of each of said slots being in said vertical web and a part in said horizontal flange; a saddle aligned with each of said slots and depending beneath said horizontal flange; said saddle having a vertical portion and a horizontal portion; an axle for supporting each of said carrier rollers; the ends of said axles passing through said slots and seated in said saddles.

(References on following page)

References Cited in the file of this patent

UNITED STATES PATENTS

| | | |
|---|---|---|
| 1,406,228 | Riedel | Feb. 14, 1922 |
| 1,883,426 | Walter et al. | Oct. 18, 1932 |
| 1,903,732 | Walter et al. | Apr. 11, 1933 |
| 2,238,196 | Tyler | Apr. 15, 1941 |

FOREIGN PATENTS

| 567,808 | Germany | Jan. 10, 1933 |
|---|---|---|